(12) United States Patent
Jun et al.

(10) Patent No.: US 12,222,555 B2
(45) Date of Patent: Feb. 11, 2025

(54) OPTICAL CONNECTOR PLUG FOR OUTDOOR WATERPROOF ONSITE ASSEMBLY AND METHOD FOR MANUFACTURING THE SAME

(71) Applicant: UCL Co., Ltd., Daejeon (KR)

(72) Inventors: Kun Ik Jun, Gyeongsangnam-do (KR); Pil Soon Kang, Cheongju-si (KR); Chan Soul Park, Daejeon (KR)

(73) Assignee: UCL CO., LTD., Daejeon (KR)

( * ) Notice: Subject to any disclaimer, the term of this patent is extended or adjusted under 35 U.S.C. 154(b) by 453 days.

(21) Appl. No.: 17/640,578

(22) PCT Filed: Aug. 24, 2020

(86) PCT No.: PCT/KR2020/011225
§ 371 (c)(1),
(2) Date: Mar. 4, 2022

(87) PCT Pub. No.: WO2021/060715
PCT Pub. Date: Apr. 1, 2021

(65) Prior Publication Data
US 2022/0326452 A1    Oct. 13, 2022

(30) Foreign Application Priority Data
Sep. 25, 2019   (KR) .......................... 10-2019-0117953

(51) Int. Cl.
*G02B 6/38*         (2006.01)
(52) U.S. Cl.
CPC ................................ *G02B 6/3816* (2013.01)

(58) Field of Classification Search
CPC ............... G02B 6/3816; G02B 6/3846; G02B 6/38875; G02B 6/3849
USPC .......................................................... 385/78
See application file for complete search history.

(56) References Cited

U.S. PATENT DOCUMENTS

| | | |
|---|---|---|
| 8,317,406 B2 | 11/2012 | Tamekuni et al. |
| 9,239,435 B2 | 1/2016 | Takahashi et al. |
| 10,215,929 B2 | 2/2019 | Yan et al. |
| 10,527,801 B2 | 1/2020 | Yan et al. |

(Continued)

FOREIGN PATENT DOCUMENTS

| | | |
|---|---|---|
| JP | 2009-205100 A | 9/2009 |
| JP | 2013-114001 A | 6/2013 |
| KR | 10-2009-0122499 A | 11/2009 |

(Continued)

*Primary Examiner* — Robert Tavlykaev
(74) *Attorney, Agent, or Firm* — Rabin & Berdo, P.C.

(57) ABSTRACT

An optical connector plug for outdoor waterproof onsite assembly. A frame having slits sheathes and is fixed to an optical cable when the optical cable is constructed on a site. The optical connector plug is waterproofed by a protective tube and an O-ring. The optical cable has a tip at one side which is attached to an assembly in a sealing or mechanical manner, and the frame sheathing an outer side of the optical cable has one side end to which an outer peripheral edge of the assembly is coupled, has the one or more slits which are cut from a middle to the other side end and are formed to be widened and narrowed in compliance with an outer diameter of the optical cable, and has a step on an outer peripheral edge at one side end to be held by an inner peripheral edge of a housing.

13 Claims, 6 Drawing Sheets

(56) References Cited

U.S. PATENT DOCUMENTS

| 11,598,924 B2* | 3/2023 | Okada ................. G02B 6/4432 |
| 2016/0131857 A1* | 5/2016 | Pimentel ............ G02B 6/38875 |
| | | 385/78 |

FOREIGN PATENT DOCUMENTS

| KR | 10-2010-0078242 A | 7/2010 |
| KR | 20-2016-0003163 U | 9/2016 |
| KR | 10-2018-0008566 A | 1/2018 |

* cited by examiner

OPTICAL CONNECTOR PLUG FOR OUTDOOR WATERPROOF ONSITE ASSEMBLY AND METHOD FOR MANUFACTURING THE SAME

TECHNICAL FIELD

The present invention relates to an optical connector plug for outdoor waterproof onsite assembly, and more specifically, to an optical connector plug for outdoor waterproof onsite assembly in which, since a frame having a slit sheathes and is fixed to an optical cable when the optical cable is constructed on a site, the optical cable and the frame can be easily coupled to each other, the frame is not to be detached even by high tensile strength of the optical cable, the optical connector plug can be constructed to reduce waste of the optical cable by adjusting an installation length thereof when the optical cable is installed on the site, and since the optical connector plug is waterproofed by a protective tube and an O-ring, waterproofing can be simply fulfilled on the outdoor installation site without special complex waterproofing.

BACKGROUND ART

In general, an optical cable is used to process massive data not only via a fiber-to-the-home (FTTH) network but also a mobile communication network, and an optical connector is used at a branch point and an end point of the optical cable so as to effectively manage the optical cable used for the networks.

An optical connector used at an outdoor site is generally installed in a waterproof-sealed protective box such as an optical junction case or an optical terminal box to protect an inside of the optical connector from rainwater, moisture, dust, or the like. The optical connector is usually installed using a sealed protective box such as an optical terminal box, and the protective box includes an adapter or the like which can connect the optical connector and a junction board on which a junction portion and a redundant length of the optical cable can be neatened and stored.

When the optical terminal box is used, the optical terminal box has to be opened and closed whenever an optical cable is connected or disconnected, and an operation for opening and closing an optical fiber junction board inside the optical terminal box has to be performed. Hence, problems can arise in that an optical loss increases and communications disruption can occur when a core of an optical fiber of another line is constructed by being held between a structure or being sharply bent due to a constructor's mistake during operation. In addition, a problem can arise in that an optical line disruption can occur when rainwater infiltrates into the optical terminal box in wet weather due to waterproofing break in a process of opening and closing a cover of the optical terminal box.

Prior Patent (Korean Unexamined Patent Publication No. 10-2009-0122499) discloses a configuration including: a fiber optic connector that has a connector housing and a plug ferrule, with at least a part of the plug ferrule being positioned in the connector housing and the plug ferrule being mountable on one end portion of at least one optical fiber; and a plug body that extends in a length direction between both end portions as a first end portion and a second end portion and has a cylindrical shroud in the vicinity of the first end portion, the shroud having a pair of openings at both sides and the openings extending in the length direction from at least a middle to the first end portion of the shroud, in which the fiber optic connector is disposed inside the plug body so as to approach the plug ferrule inside the shroud through the first end portion of the plug body.

However, Prior Patent provides a method that can be applied to an optical cable which is manufactured to have a standardized length in a factory and thus has problems in that the entire optical cable has to be replaced since the occurrence of an abnormal state during onsite construction is not possible to cope with, and an optical connector plug of the optical cable is not possible to manufacture to match a construction length of the optical cable, thus causing a problem of significant waste of the optical cable.

SUMMARY OF INVENTION

Technical Problem

An object of the present invention is to provide an optical connector plug for outdoor waterproof onsite assembly in which, since a frame having a slit sheathes and is fixed to an optical cable when the optical cable is constructed on a site, the optical cable and the frame can be easily coupled to each other, the frame is not to be detached even by high tensile strength of the optical cable, the optical connector plug can be constructed to reduce waste of the optical cable by adjusting an installation length thereof when the optical cable is installed on the site, and since the optical connector plug is waterproofed by a protective tube and an O-ring, waterproofing can be simply fulfilled on the outdoor installation site without special complex waterproofing.

Solution to Problem

According to the present invention to achieve the object, an optical connector plug for outdoor waterproof onsite assembly, includes: an optical connector that is coupled to a tip of an optical cable which is cut on a site, in which the tip at one side of the optical cable is attached to an assembly in a sealing or mechanical manner, and a frame sheathing an outer side of the optical cable has one side end to which an outer peripheral edge of the assembly is coupled, has one or more slits which are cut from a middle to the other side end and are formed to be widened and narrowed in compliance with an outer diameter of the optical cable, and has a step on an outer peripheral edge at one side end to be held by an inner peripheral edge of a housing so as to withstand tensile strength applied to the outdoor optical cable.

The frame sheathes a sleeve and the optical cable and has one side end which is coupled to the assembly. The sleeve sheathes a sealing part at which the cut tip at the one side of the optical cable is attached to the other end of an optical fiber of the optical cable of the assembly. A fixing unit is coupled to the other end of the frame to fix the frame to an outer peripheral edge of the optical cable. The housing is coupled to an outer side of the frame, and a protective cap is coupled to one end of the housing through a rotating cap. A protective tube is coupled to sheathe the other end of the housing and the optical cable. A boot is coupled to an outer side of the protective tube and inhibits the optical cable from being excessively bent.

The sleeve is configured of a shrinkable tube or an adhesive reinforcing member, and the protective tube (80) is configured of a shrinkable tube.

The housing has an O-ring groove on an outer peripheral edge at one side to which an O-ring is coupled, and the one side having the O-ring groove is coupled to an adaptor formed in an optical terminal box such that waterproofing is fulfilled with the O-ring in the O-ring groove.

One side end of the assembly is formed to more protrude than one side end of the housing so as to be easily connected to the adaptor formed in the optical terminal box when being coupled to the adaptor.

One end of a connection body connected to the housing is coupled to an outer peripheral edge of the protective cap, and the other side of the connection body is formed in a clip shape to be inserted into and coupled to an outer peripheral edge of the housing. An inner peripheral edge at the other side of the protective cap has threads which are coupled to and fixed to the rotation cap through rotation of threads formed on an outer peripheral edge of the rotation cap.

The fixing unit is configured of one of a clamp ring, a rotating ring, or a fastening ring.

A method for manufacturing an optical connector plug for outdoor waterproof onsite assembly of the present invention includes: a step of cutting the optical cable based on a construction length thereof on a site where the optical cable is constructed; a step of connecting a tip at one side of the cut optical cable to the other side end of an optical cable which is coupled to the assembly and sheathing an attachment part by inserting the sleeve into a connection part; a step of sheathing the outer side of the connected optical cable with the frame and inserting and fixing the assembly into an edge at one side of the frame; a step of coupling the fixing unit to an edge at the other side of the frame to fix the frame through compression; a step of coupling the protective cap protecting the assembly to one end of the frame and coupling and fixing the housing to an outer peripheral edge of the frame by coupling the protective cap to the rotation cap; a step of coupling the protective tube such that the other side of the housing is partially sheathed to fulfill waterproofing and the outer peripheral edge of the optical cable is sheathed; and a step of protecting the optical cable from excessive bending by coupling the boot to the outer side of the protective tube.

The frame has one side end to which the outer peripheral edge of the assembly is coupled, has the one or more slits which are cut from the middle to the other side end and are formed to be widened and narrowed in compliance with the outer diameter of the optical cable, and has a step on an outer peripheral edge at one side end to be held by the inner peripheral edge of the housing so as to withstand tensile strength applied to the outdoor optical cable.

Advantageous Effects of Invention

The present invention has an effect in that, since a frame having a slit sheathes and is fixed to an optical cable when the optical cable is constructed on a site, the optical cable and the frame can be easily coupled to each other, and the frame is not to be detached even by high tensile strength of the optical cable.

In addition, the present invention has another effect in that the optical connector plug can be constructed to reduce waste of the optical cable by adjusting an installation length thereof when the optical cable is installed on the site.

In addition, the present invention has still another effect in that, since the optical connector plug is waterproofed by a protective tube and an O-ring, waterproofing can be simply fulfilled on the outdoor installation site without special complex waterproofing.

DESCRIPTION OF PREFERRED EMBODIMENTS

Figure 1:
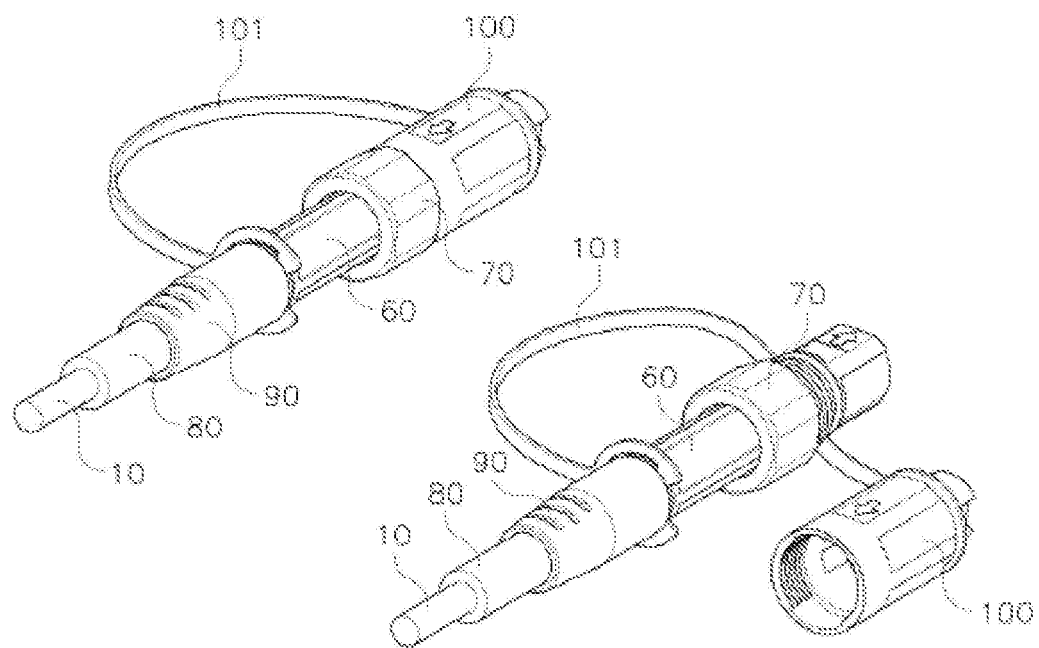
FIG. 1 is perspective view illustrating an overall configuration of an optical connector plug for outdoor waterproof onsite assembly according to an embodiment of the present invention.

As a preferred embodiment of the present invention, there is provided an optical connector which is coupled to a tip of an optical cable cut on a site, the tip at one side of the optical cable 10 is attached to an assembly 20 in a sealing or mechanical manner, and a frame 40 sheathing an outer side of the optical cable 10 has one side end to which an outer peripheral edge of the assembly 20 is coupled, has one or more slits 42 which are cut from a middle to the other side end and are formed to be widened and narrowed in compliance with an outer diameter of the optical cable 10, and has a step 41 on an outer peripheral edge at one side end to be held by an inner peripheral edge of a housing 60 so as to withstand the tensile strength applied to the outdoor optical cable 10.

In addition, as another preferred embodiment of the present invention, there is provided a method for manufacturing an optical connector for outdoor waterproof onsite assembly, including: Step S10 of cutting the optical cable 10 based on a construction length thereof on a site where the optical cable 10 is constructed; Step S20 of connecting a tip at one side of the cut optical cable 10 to the other side end of an optical cable 10 which is coupled to the assembly 20 and sheathing an attachment part by inserting the sleeve 30 into a connection part; Step S30 of sheathing the outer side of the connected optical cable 10 with the frame 40 and inserting and fixing the assembly 20 into an edge at one side of the frame 40; Step S40 of coupling the fixing unit 50 to an edge at the other side of the frame 40 to fix the frame 40 through compression; Step S50 of coupling the protective cap 100 protecting the assembly 20 to one end of the frame 40 and coupling and fixing the housing 60 to an outer peripheral edge of the frame 40 by coupling the protective cap 100 to the rotation cap 70; Step S60 of coupling the protective tube 80 such that the other side of the housing 60 is partially sheathed to fulfill waterproofing and the outer peripheral edge of the optical cable 10 is sheathed; and Step S70 of protecting the optical cable from excessive bending by coupling the boot 90 to the outer side of the protective tube 80

Description of Embodiments

Hereinafter, specific embodiments of the present invention will be described with reference to the accompanying drawings. The embodiments of the present invention are provided to describe one invention, and a scope of the patent right is not limited to the illustrated embodiments. The present invention is not to be construed to be limited to the drawings, since the illustrated drawings provide enlarged views of only essential contents for clarity of the invention, and incidental contents are omitted.

According to the present invention, in an optical connector which is coupled to a tip of an optical cable cut on a site, the tip at one side of the optical cable 10 is attached to an assembly 20 in a sealing or mechanical manner, and a frame 40 sheathing an outer side of the optical cable 10 has one side end to which an outer peripheral edge of the assembly 20 is coupled, has one or more slits 42 which are cut from a middle to the other side end and are formed to be widened and narrowed in compliance with an outer diameter of the optical cable 10, and has a step 41 on an outer peripheral edge at one side end to be held by an inner peripheral edge of a housing 60 so as to withstand the tensile strength applied to the outdoor optical cable 10.

The frame 40 sheathes a sleeve 30 and the optical cable 10 and has one side end which is coupled to the assembly 20. The sleeve 30 sheathes a sealing part at which a cut tip at one side of the optical cable 10 is attached to the other end of an optical fiber of the optical cable 10 of the assembly 20. A fixing unit 50 is coupled to the other end of the frame 40 to fix the frame 40 to an outer peripheral edge of the optical cable 10. The housing 60 is coupled to an outer side of the frame 40, and a protective cap 100 is coupled to one end of the housing 60 through a rotation cap 70. A protective tube 80 is coupled to sheathe the other end of the housing 60 and the optical cable 10. A boot 90 is coupled to an outer side of the protective tube 80 and inhibits the optical cable 10 from being excessively bent.

The sleeve 30 is configured of a shrinkable tube or an adhesive reinforcing member, and the protective tube 80 is configured of a shrinkable tube.

The housing 60 has an O-ring groove 62 on an outer peripheral edge at one side to which an O-ring 61 is coupled, and the one side having the O-ring groove 62 is coupled to an adaptor formed in an optical terminal box such that waterproofing is fulfilled with the O-ring 61 in the O-ring groove 62.

One side end of the assembly 20 is formed to more protrude than one side end of the housing 60 so as to be easily connected to the adaptor formed in the optical terminal box when being coupled to the adaptor.

One end of a connection body 101 connected to the housing 60 is coupled to an outer peripheral edge of the protective cap 100, and the other side of the connection body 101 is formed in a clip shape to be inserted into and coupled to an outer peripheral edge of the housing 60. An inner peripheral edge at the other side of the protective cap has threads which are coupled to and fixed to the rotation cap 70 through rotation of threads formed on an outer peripheral edge of the rotation cap 70.

The fixing unit 50 is configured of one of a clamp ring, a rotating ring, or a fastening ring.

An onsite assembly process of an optical connector plug for outdoor waterproof onsite assembly includes: Step S10 of cutting the optical cable 10 based on a construction length thereof on a site where the optical cable 10 is constructed; Step S20 of connecting a tip at one side of the cut optical cable 10 to the other side end of an optical cable 10 which is coupled to the assembly 20 and sheathing an attachment part by inserting the sleeve 30 into a connection part; Step S30 of sheathing the outer side of the connected optical cable 10 with the frame 40 and inserting and fixing the assembly 20 into an edge at one side of the frame 40; Step S40 of coupling the fixing unit 50 to an edge at the other side of the frame 40 to fix the frame 40 through compression; Step S50 of coupling the protective cap 100 protecting the assembly 20 to one end of the frame 40 and coupling and fixing the housing 60 to an outer peripheral edge of the frame 40 by coupling the protective cap 100 to the rotation cap 70; Step S60 of coupling the protective tube 80 such that the other side of the housing 60 is partially sheathed to fulfill waterproofing and the outer peripheral edge of the optical cable 10 is sheathed; and Step S70 of protecting the optical cable from excessive bending by coupling the boot 90 to the outer side of the protective tube 80.

The frame 40 has the one side end to which the outer peripheral edge of the assembly 20 is coupled, has the one or more slits 42 which are cut from the middle to the other side end and are formed to be widened and narrowed in compliance with the outer diameter of the optical cable 10, and has a step 41 on an outer peripheral edge at one side end to be held by the inner peripheral edge of the housing 60 so as to withstand the tensile strength applied to the outdoor optical cable 10.

FIG. 1 is perspective view illustrating an overall configuration of the optical connector plug for outdoor waterproof onsite assembly according to an embodiment of the present invention. In the optical connector that is coupled to a tip of an optical cable cut on a site, the tip of the optical cable 10 is connected to the other end of the optical cable 10, which is coupled to the assembly 20, in a sealing or mechanical manner is connected, and the frame 40 sheathing the outer side of the optical cable 10 has the one side end to which the outer peripheral edge of the assembly 20 is coupled, has the one or more slits 42 which are cut from the middle to the other side end and are formed to be widened and narrowed in compliance with the outer diameter of the optical cable 10, and has the step 41 on the outer peripheral edge at the one side end to be held by the inner peripheral edge of the housing 60 so as to withstand the tensile strength applied to the outdoor optical cable 10.

Figure 2:
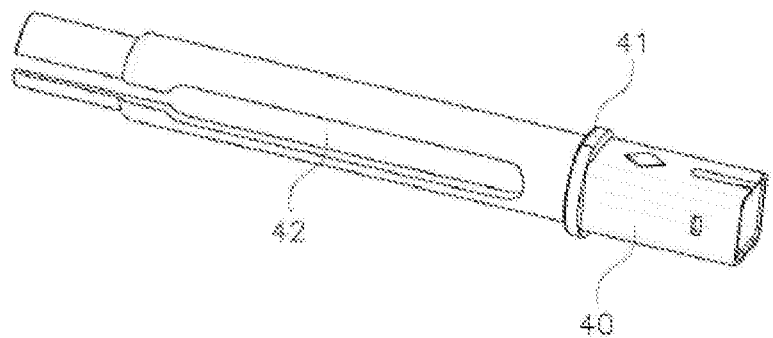
FIG. 2 is a view illustrating an overall configuration of a frame of the optical connector plug for outdoor waterproof onsite assembly according to the present invention.
Figure 3:
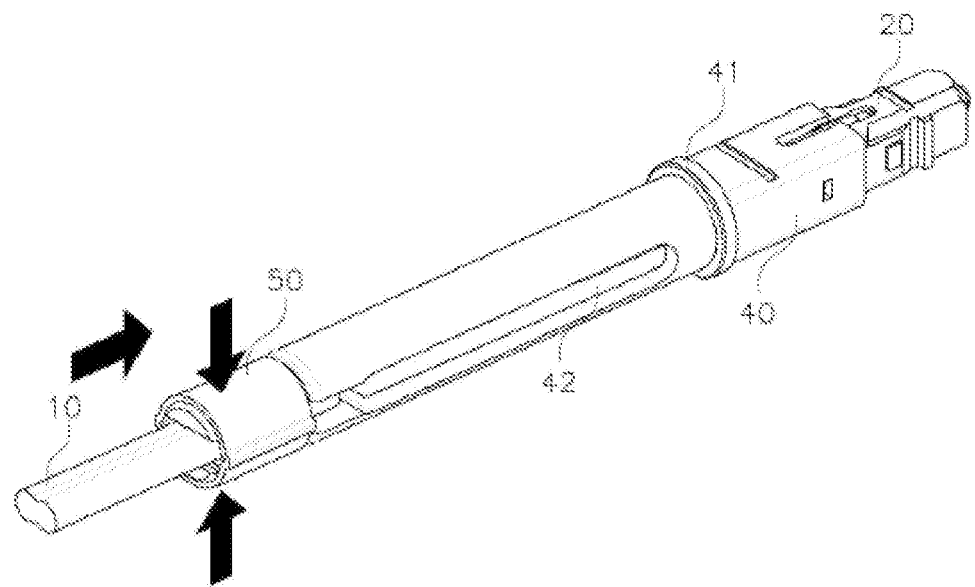
FIG. 3 is a view illustrating a state where the frame of the optical connector plug for outdoor waterproof onsite assembly is fixed to an outer peripheral edge of an optical cable through a crimping ring, according to the present invention.
Figure 4:
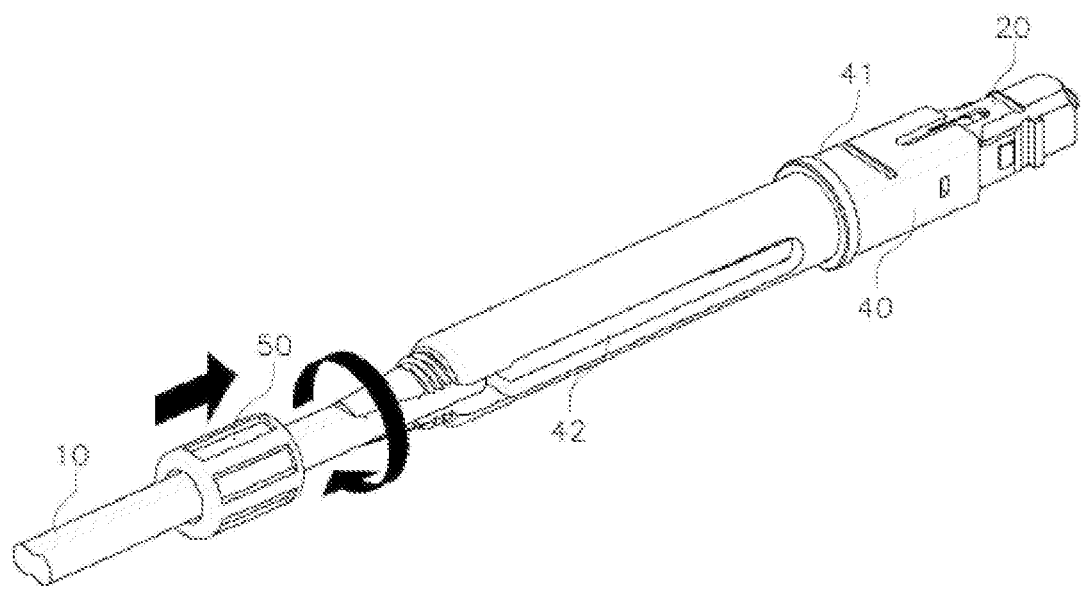
FIG. 4 is a view illustrating a state where the frame of the optical connector plug for outdoor waterproof onsite assembly is fixed to the outer peripheral edge of the optical cable through a rotating ring, according to the present invention.
Figure 5:
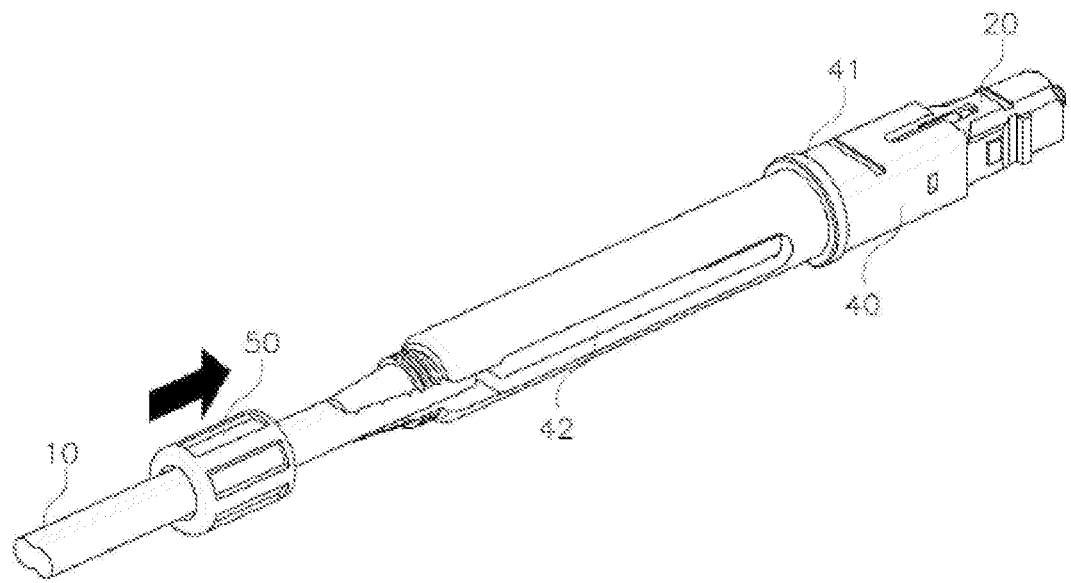
FIG. 5 is a view illustrating a state where the frame of the optical connector plug for outdoor waterproof onsite assembly is fixed to the outer peripheral edge of the optical cable through a fastening ring, according to the present invention.
Figure 6:
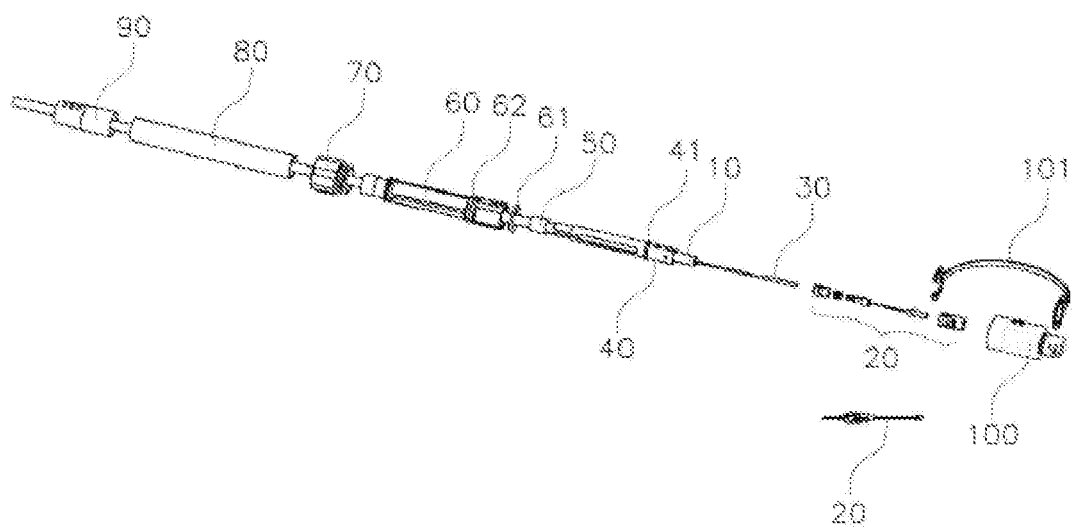
FIG. 6 is an exploded view of the optical connector plug for outdoor waterproof onsite assembly according to the present invention.
Figure 7:
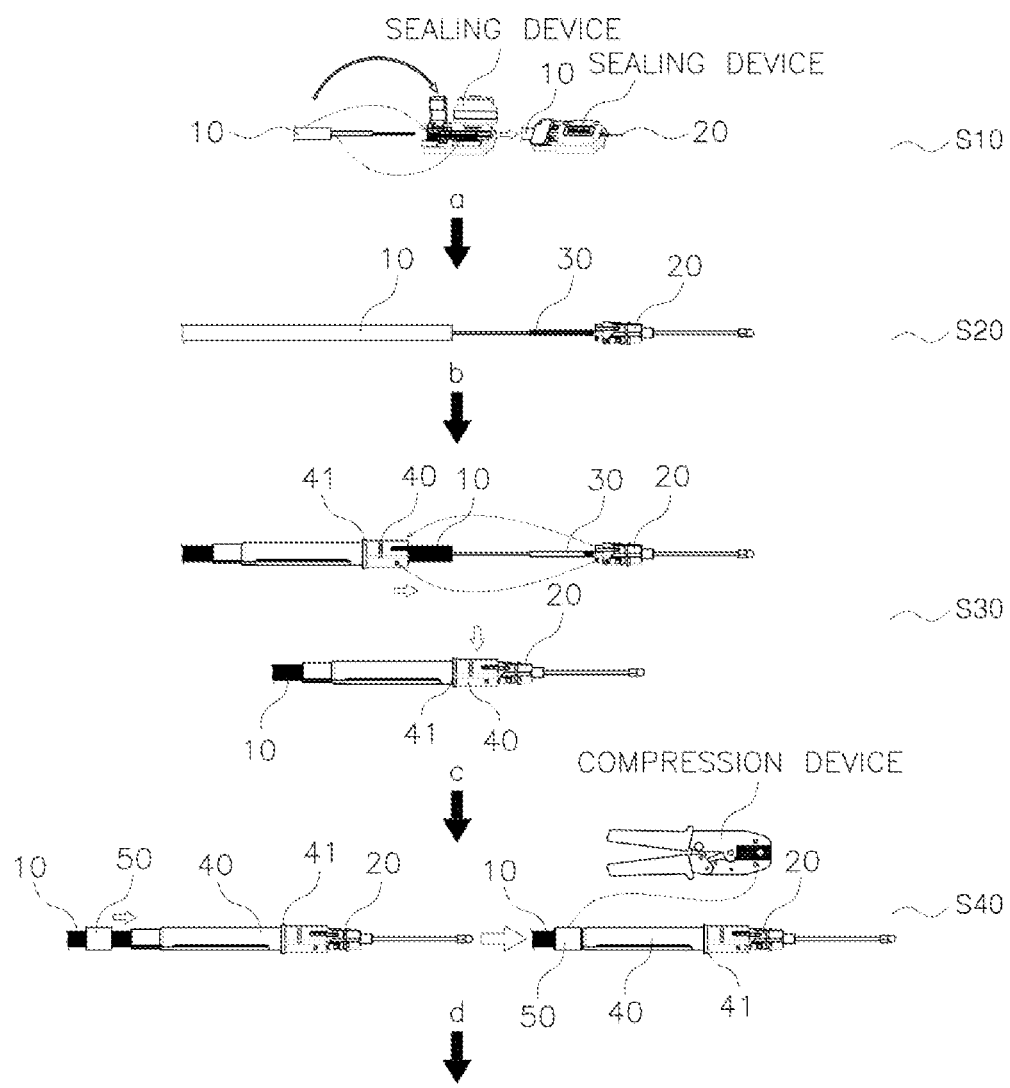
FIG. 7 is a view illustrating a process of a method for manufacturing an optical connector plug which is formed through a method for manufacturing an optical connector plug for outdoor waterproof onsite assembly according to the present invention.
Figure 8:
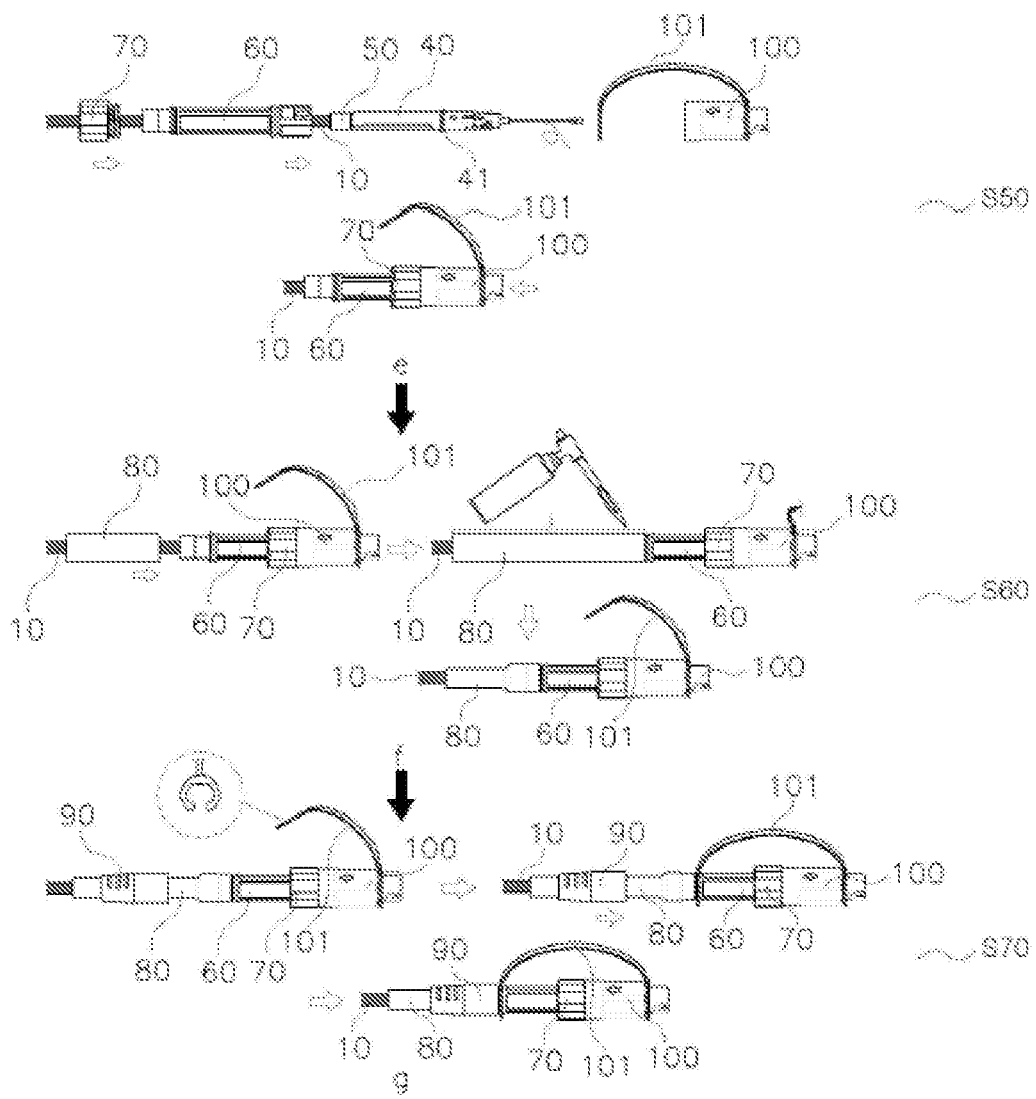
FIG. 8 is a view illustrating next steps after the method for manufacturing an optical connector plug in FIG. 4.
Figure 9:
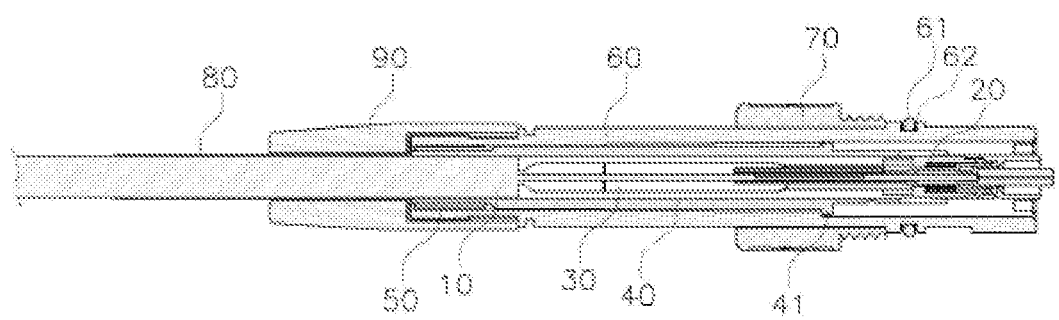
FIG. 9 is a view illustrating a sectional view of the optical connector plug for outdoor waterproof onsite assembly according to the present invention.
Figure 10:
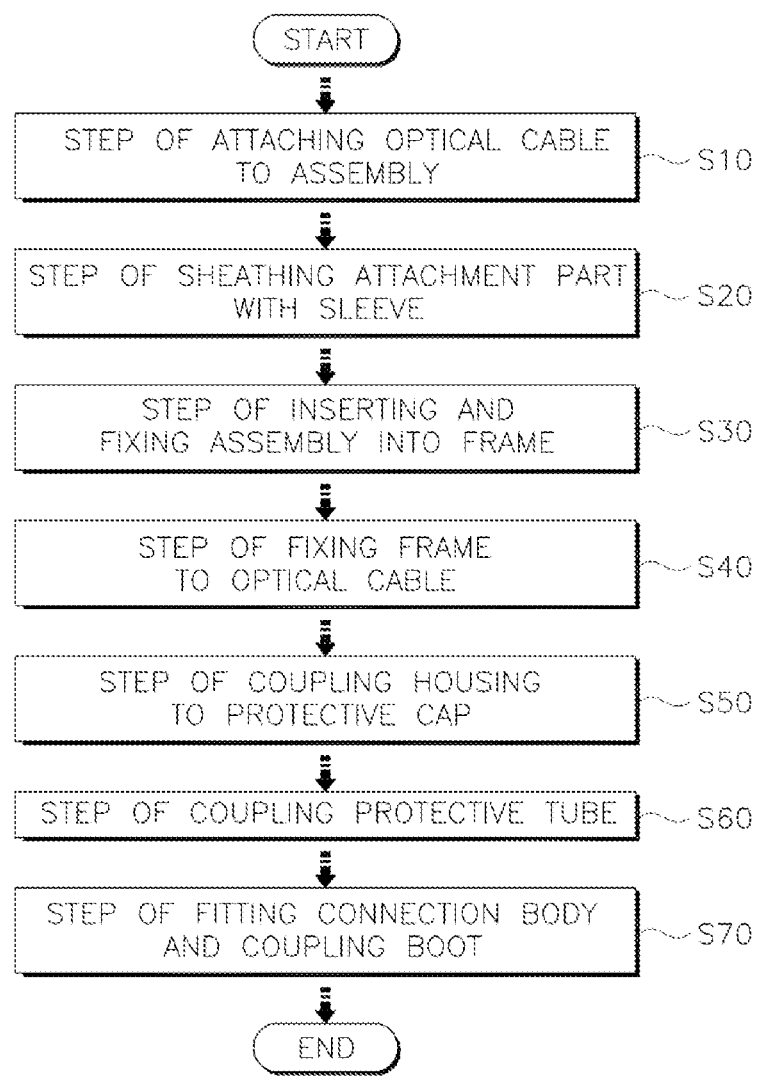
FIG. 10 is a flowchart of a full procedure of a method for manufacturing an optical connector plug for outdoor waterproof onsite assembly according to an embodiment of the present invention.

FIG. 2 is a view illustrating an overall configuration of the frame of the optical connector plug for outdoor waterproof onsite assembly according to the present invention. FIG. 3 is a view illustrating a state where the frame of the optical connector plug for outdoor waterproof onsite assembly is fixed to the outer peripheral edge of the optical cable through a crimping ring, according to the present invention. FIG. 4 is a view illustrating a state where the frame of the optical connector plug for outdoor waterproof onsite assembly is fixed to the outer peripheral edge of the optical cable through a rotating ring, according to the present invention. FIG. 5 is a view illustrating a state where the frame of the optical connector plug for outdoor waterproof onsite assembly is fixed to the outer peripheral edge of the optical cable through a fastening ring, according to the present invention. FIG. 6 is an exploded view of the optical connector plug for outdoor waterproof onsite assembly according to the present invention. FIG. 7 is a view illustrating a process of a method for manufacturing an optical connector plug which is formed through a method for manufacturing an optical connector plug for outdoor waterproof onsite assembly according to the present invention. FIG. 8 is a view illustrating next steps after the method for manufacturing an optical connector plug in FIG. 4. FIG. 9 is a view illustrating a sectional view of the optical connector plug for outdoor waterproof onsite assembly according to the present invention. FIG. 10 is a flowchart of a full procedure of a method for manufacturing an optical connector plug for outdoor waterproof onsite assembly according to an embodiment of the present invention.

With reference to FIGS. 2 and 6, the frame 40 sheathes the sleeve 30 and the optical cable 10 and has the one side end which is coupled to the assembly 20. The sleeve 30 sheathes the sealing part at which the cut tip at the one side of the optical cable 10 is attached to the other end of the optical fiber of the optical cable 10 of the assembly 20. The fixing unit 50 is coupled to the other end of the frame 40 to fix the frame 40 to the outer peripheral edge of the optical cable 10. The housing 60 is coupled to the outer side of the frame 40, and the protective cap 100 is coupled to the one end of the housing 60 through the rotation cap 70. The protective tube 80 is coupled to sheathe the other end of the housing 60 and the optical cable 10. The boot 90 is coupled to the outer side of the protective tube 80 and inhibits the optical cable 10 from being excessively bent.

After the optical cable 10 is cut based on the construction length thereof on a site where the optical cable 10 is constructed, the other end of the assembly 20 and one end of the optical cable 10 can be connected to each other by a sealing device or a mechanical connection device.

The connection part protects an attachment portion with the sleeve 30 when the assembly 20 and the optical cable 10 are sealed, and the frame can be coupled without using the sleeve 30 when the assembly 20 and the optical cable 10 are mechanically coupled to each other.

The assembly 20 is configured of either an uncoupled form or an assembled module form, and thus an operator can select a form which is easy to use on a construction site.

The sleeve 30 is configured of the shrinkable tube or the adhesive reinforcing member, thus, protecting the attachment part by sheathing the attachment part of the optical cable 10 and the assembly 20 which are connected through sealing.

As illustrated in FIG. 2, the frame 40 has the one side end to which the outer peripheral edge of the assembly 20 is coupled, has the one or more slits 42 which are cut from the middle to the other side end and are formed to be widened in compliance with the outer diameter of the optical cable 10, and has the step 41 on the outer peripheral edge at one side end to be held by the inner peripheral edge of the housing 60 so as to withstand the tensile strength applied to the optical cable 10 when the housing 60 is coupled to the adaptor in the optical terminal box through the rotation cap 70.

As illustrated in FIGS. 3 to 5, the fixing unit 50 can be configured of one of a clamp ring, a rotating ring, or a fastening ring.

A coupling member is formed at the other side of the frame 40 to correspond to a shape of the fixing unit 50, and the coupling member has a rotation thread or a holding step at an outer side thereof to be coupled to the rotating ring or the fastening ring. Hence, the frame 40 is pressurized, and the optical cable 10 and the frame 40 are fixed.

In this case, the coupling member, to which the fixing unit 50 is coupled, is formed in a tapering shape to be coupled to the fixing unit 50 while gradually tightening the optical cable 10 when the fixing unit 50 is coupled to the coupling member.

When the fixing unit 50 is configured of the clamp ring, the coupling member is pressurized to be coupled by a compression unit.

The protective cap 100 protecting the assembly 20 is coupled to one end of the housing 60, and the housing 60 is coupled and fixed to the outer peripheral edge of the frame 40 by coupling the protective cap 100 to the rotation cap 70.

In this case, the housing 60 has the O-ring groove 62 on the outer peripheral edge at the one side to which the O-ring 61 is coupled, and the one side having the O-ring groove 62 is coupled to the adaptor formed in the optical terminal box such that waterproofing is to be fulfilled with the O-ring 61 in the O-ring groove 62.

When the housing 60 is coupled thereto, the one side end of the assembly 20 is formed to more protrude than the one side end of the housing 60 so as to be easily connected to the adaptor formed in the optical terminal box when being coupled to the adaptor.

The one end of the connection body 101 connected to the housing 60 is coupled to the outer peripheral edge of the protective cap 100, and the other side of the connection body 101 is formed in a clip shape to be inserted into and coupled to the outer peripheral edge of the housing 60. The inner peripheral edge at the other side of the protective cap has threads which are coupled to and fixed to the rotation cap 70 through rotation of threads formed on the outer peripheral edge of the rotation cap 70.

The protective tube 80 is coupled such that the other side of the housing 60 is partially sheathed to fulfill waterproofing and the outer peripheral edge of the optical cable 10 is sheathed.

In this case, the protective tube 80 is configured of a shrinkable tube to sheathe the outer peripheral edge at the other side of the housing 60 and the outer peripheral edge of the optical cable 10 through heat shrink such that the waterproofing is fulfilled.

The boot 90 is coupled on the protective tube 80 at an outer side of the housing 60 and inhibits the optical cable at an end of the optical connector plug from being excessively bent.

With reference to FIGS. 7 to 10, the method for manufacturing the optical connector of the present invention includes: Step S10 of cutting the optical cable 10 based on a construction length thereof on a site where the optical cable 10 is constructed; Step S20 of connecting the tip at one side of the cut optical cable 10 to the other side end of an optical cable 10 which is coupled to the assembly 20 and sheathing the connection part by inserting the sleeve 30 into a part at which connection is performed; Step S30 of sheathing the outer side of the connected optical cable 10 with the frame 40 and inserting and fixing the assembly 20 into the edge at the one side of the frame 40; Step S40 of coupling the fixing unit 50 to the edge at the other side of the frame 40 to fix the frame 40 through compression; Step S50 of coupling the protective cap 100 protecting the assembly 20 to the one end of the frame 40 and coupling and fixing the housing 60 to the outer peripheral edge of the frame 40 by coupling the protective cap 100 to the rotation cap 70; Step S60 of coupling the protective tube 80 such that the other side of the housing 60 is partially sheathed to fulfill waterproofing and the outer peripheral edge of the optical cable 10 is sheathed; and a step S70 of protecting the edge at the other side of the frame 40 by coupling the boot 90 to the frame 40.

In Step S10 of cutting the optical cable based on the construction length thereof, the optical cable 10 is cut based on the construction length on the site where the optical cable 10 is constructed.

In Step S20 of sheathing the connection part, the optical cable 10 is cut based on the construction length thereof on the site where the optical cable 10 is constructed, and then the tip at one side of the cut optical cable is connected to the other end of the optical cable, which is coupled to the assembly 20, by a sealing device or a mechanical connection device, and the connection part is to be sheathed by inserting the sleeve 30 into the connection part.

In this case, the assembly 20 and the optical cable 10 can be mechanically coupled to each other without sealing of the connection part, and the frame is to be directly coupled to the outer peripheral edge of the mechanically coupled optical cable 10.

The sleeve 30 is configured of the shrinkable tube or the adhesive reinforcing member, thus, protecting the attachment part by sheathing the attachment part of the optical cable 10 and the assembly 20 which are connected to each other.

When the sleeve 30 sheathes the attachment part through Step S20 of sheathing the attachment part, the frame 40 is coupled to the outer side of the attached optical cable 10 through Step S30 of inserting and fixing the assembly 20, and the assembly 20 is inserted and fixed into the edge at one side of the frame 40.

In this case, the frame 40 has the one side end to which the outer peripheral edge of the assembly 20 is coupled, has the one or more slits 42 which are cut from the middle to the other side end and are formed to be widened in compliance with the outer diameter of the optical cable 10, and has the step 41 on the outer peripheral edge at the one side end to be held by the inner peripheral edge of the housing 60 so as to withstand the tensile strength applied to the optical cable 10 when the housing 60 is coupled to the adaptor in the optical terminal box through the rotation cap 70.

When the frame 40 is coupled to the outer side of the optical cable 10 through Step S30 of inserting and fixing the assembly 20, the fixing unit 50 is coupled to the edge at the other side of the frame 40 through Step S40 of fixing the frame 40, and the frame 40 is fixed by the fixing unit 50 with compression from a compression device.

In this case, the fixing unit 50 can be configured of one of a clamp ring, a rotating ring, or a fastening ring.

The coupling member is formed at the other side of the frame to correspond to the shape of the fixing unit, and the coupling member has the rotation thread or the holding step at the outer side thereof to be coupled to the rotating ring or the fastening ring. Hence, the frame 40 is pressurized, and the optical cable 10 and the frame 40 are fixed.

When the frame 40 is fixed by the fixing unit 50 through Step S40 of fixing the frame 40, the protective cap 100 protecting the assembly 20 is coupled to the one end of the housing 60 through Step S50 of coupling and fixing the housing 60, and the housing 60 is coupled and fixed to the outer peripheral edge of the frame 40 by coupling the protective cap 100 and the rotation cap 70 to each other.

In this case, the housing 60 has the O-ring groove 62 on the outer peripheral edge at the one side to which the O-ring 61 is coupled, and the one side having the O-ring groove 62 is coupled to the adaptor formed in the optical terminal box such that waterproofing is to be fulfilled with the O-ring 61 in the O-ring groove 62.

When the housing 60 is coupled thereto, the one side end of the assembly 20 is formed to more protrude than the one side end of the housing 60 so as to be easily connected to the adaptor formed in the optical terminal box when being coupled to the adaptor.

The one end of the connection body 101 connected to the housing 60 is coupled to the outer peripheral edge of the protective cap 100, and the other side of the connection body 101 is formed in the clip shape to be inserted into and coupled to the outer peripheral edge of the housing 60. The inner peripheral edge at the other side of the protective cap has threads which are coupled to and fixed to the rotation cap 70 through rotation of threads formed on the outer peripheral edge of the rotation cap 70.

When the housing 60 is fixed to the outer side of the frame 40 through Step S50 of coupling and fixing the housing 60, the protective tube 80 is coupled such that the other side of the housing 60 is partially sheathed to fulfill waterproofing and the outer peripheral edge of the optical cable 10 is sheathed through Step S60 of coupling the protective tube 80.

In this case, the protective tube 80 is configured of the shrinkable tube to sheathe the outer peripheral edge at the other side of the housing 60 and the outer peripheral edge of the optical cable 10 through heat shrink such that the waterproofing is fulfilled.

When the protective tube 80 is coupled through Step S60 of coupling the protective tube 80, the boot 90 is coupled to the other side of the frame 40 through Step S70 of protecting the edge of the frame 40 such that the optical cable is protected from excessive bending of the optical cable.

When the optical cable 10 is cut by a set length thereof on the site through the process, and then the optical connector plug is formed at the tip of the optical cable 10, the protective cap 100 is removed, the optical connector plug is coupled to the adaptor in the optical terminal box, and then the adaptor is coupled and fixed to the optical connector plug through the rotation cap 70.

The present invention realized as described above has an effect in that, since the integral frame having the slit sheathes and is fixed to the optical cable when the optical cable is constructed on the site, the optical cable and the frame can be easily coupled to each other, and the frame is not to be detached even by high tensile strength of the optical cable.

In addition, the present invention has another effect in that the optical connector plug can be constructed to reduce waste of the optical cable by adjusting the installation length thereof when the optical cable is installed on the site.

In addition, the present invention has still another effect in that, since the optical connector plug is waterproofed by the protective tube and the O-ring, waterproofing can be simply fulfilled on the outdoor installation site without special complex waterproofing.

The optical connector plug for outdoor waterproof onsite assembly described above is not limited to the configurations and operation methods of the embodiments described above. The embodiments can have a configuration in which all or some embodiments are selectively combined such that the embodiments described above can be variously modified.

The invention claimed is:

1. An optical connector plug for outdoor waterproof onsite assembly, comprising:
an optical connector that is coupled to a tip of an optical cable cut on a site,
wherein the tip at one side of the optical cable (10) is attached to an assembly (20) in a sealing or mechanical manner, and a frame (40) sheathing an outer side of the optical cable (10) has one side end to which an outer peripheral edge of the assembly (20) is coupled, has one or more slits (42) which are cut from a middle to another side end and are formed to be widened and narrowed in compliance with an outer diameter of the optical cable (10), and has a step (41) on an outer peripheral edge at one side end to be held by an inner peripheral edge of a housing (60) so as to withstand tensile strength applied to the optical cable (10)
wherein the frame (40) sheathes a sleeve (30) and the optical cable (10),
wherein the sleeve (30) sheathes a sealing part at which a cut tip at one side of the optical cable (10) is attached to an end of an optical fiber of the optical cable (10) of the assembly (20),
wherein a fixing unit (50) is coupled to the other side end of the frame (40) to fix the frame (40) to an outer peripheral edge of the optical cable (10),
wherein the housing (60) is coupled to an outer side of the frame (40), and a protective cap (100) is coupled to one end of the housing (60) through a rotation cap (70),
wherein a protective tube (80) is coupled to sheathe another end of the housing (60) and the optical cable (10), and
wherein a boot (90) is coupled to an outer side of the protective tube (80) and inhibits the optical cable (10) from being excessively bent.

2. The optical connector plug for outdoor waterproof onsite assembly according to claim 1,
wherein the sleeve (30) is configured of a shrinkable tube or an adhesive reinforcing member, and the protective tube (80) is configured of a shrinkable tube.

3. A method for manufacturing an optical connector plug for outdoor waterproof onsite assembly according to claim 2, comprising:
a step (S10) of cutting the optical cable (10) based on a construction length of the optical cable on a site where the optical cable (10) is constructed;
a step (S20) of connecting the tip at one side end of the cut optical cable (10) to another side end of the optical cable (10) which is coupled to the assembly (20) and sheathing an attachment part by inserting the sleeve (30) into a connection part;
a step (S30) of sheathing an outer side of the connected optical cable (10) with the frame (40) and inserting and fixing the assembly (20) into an edge at one side of the frame (40);
a step (S40) of coupling the fixing unit (50) to an edge at another side of the frame (40) to fix the frame (40) through compression;
a step (S50) of coupling the protective cap (100) protecting the assembly (20) to one end of the frame (40) and coupling and fixing the housing (60) to the outer peripheral edge of the frame (40) by coupling the protective cap (100) to the rotation cap (70);
a step (S60) of coupling the protective tube (80) such that a side of the housing (60) is partially sheathed to fulfill waterproofing and the outer peripheral edge of the optical cable (10) is sheathed; and
a step (S70) of protecting the optical cable from excessive bending by coupling the boot (90) to the outer side of the protective tube (80).

4. The optical connector plug for outdoor waterproof onsite assembly according to claim 1,
wherein the housing (60) has an O-ring groove (62) on an outer peripheral edge at one side to which an O-ring (61) is coupled, and the one side having the O-ring groove (62) is coupled to an adaptor formed in an optical terminal box such that waterproofing is fulfilled with the O-ring (61) in the O-ring groove (62).

5. A method for manufacturing an optical connector plug for outdoor waterproof onsite assembly according to claim 4, comprising:
a step (S10) of cutting the optical cable (10) based on a construction length of the optical cable on a site where the optical cable (10) is constructed;
a step (S20) of connecting the tip at one side end of the cut optical cable (10) to another side end of the optical cable (10) which is coupled to the assembly (20) and sheathing an attachment part by inserting the sleeve (30) into a connection part;
a step (S30) of sheathing an outer side of the connected optical cable (10) with the frame (40) and inserting and fixing the assembly (20) into an edge at one side of the frame (40);
a step (S40) of coupling the fixing unit (50) to an edge at another side of the frame (40) to fix the frame (40) through compression;
a step (S50) of coupling the protective cap (100) protecting the assembly (20) to one end of the frame (40) and coupling and fixing the housing (60) to the outer peripheral edge of the frame (40) by coupling the protective cap (100) to the rotation cap (70);
a step (S60) of coupling the protective tube (80) such that a side of the housing (60) is partially sheathed to fulfill waterproofing and the outer peripheral edge of the optical cable (10) is sheathed; and
a step (S70) of protecting the optical cable from excessive bending by coupling the boot (90) to the outer side of the protective tube (80).

6. The optical connector plug for outdoor waterproof onsite assembly according to claim 1,
wherein one side end of the assembly (20) is formed to protrude more than one side end of the housing (60) so as to be easily connected to an adaptor formed in an optical terminal box when being coupled to the adaptor.

7. A method for manufacturing an optical connector plug for outdoor waterproof onsite assembly according to claim 6, comprising:
a step (S10) of cutting the optical cable (10) based on a construction length of the optical cable on a site where the optical cable (10) is constructed;
a step (S20) of connecting the tip at one side end of the cut optical cable (10) to another side end of the optical cable (10) which is coupled to the assembly (20) and sheathing an attachment part by inserting the sleeve (30) into a connection part;
a step (S30) of sheathing an outer side of the connected optical cable (10) with the frame (40) and inserting and fixing the assembly (20) into an edge at one side of the frame (40);

a step (S40) of coupling the fixing unit (50) to an edge at another side of the frame (40) to fix the frame (40) through compression;

a step (S50) of coupling the protective cap (100) protecting the assembly (20) to one end of the frame (40) and coupling and fixing the housing (60) to the outer peripheral edge of the frame (40) by coupling the protective cap (100) to the rotation cap (70);

a step (S60) of coupling the protective tube (80) such that a side of the housing (60) is partially sheathed to fulfill waterproofing and the outer peripheral edge of the optical cable (10) is sheathed; and a step (S70) of protecting the optical cable from excessive bending by coupling the boot (90) to the outer side of the protective tube (80).

8. The optical connector plug for outdoor waterproof onsite assembly according to claim 1, wherein one end of a connection body (101) connected to the housing (60) is coupled to an outer peripheral edge of the protective cap (100), and another end of the connection body (101) is formed in a clip shape to be inserted into and coupled to an outer peripheral edge of the housing (60), and wherein an inner peripheral edge at a side of the protective cap has threads which are coupled to and fixed to the rotation cap (70) through rotation of threads formed on an outer peripheral edge of the rotation cap (70).

9. A method for manufacturing an optical connector plug for outdoor waterproof onsite assembly according to claim 8, comprising:

a step (S10) of cutting the optical cable (10) based on a construction length of the optical cable on a site where the optical cable (10) is constructed;

a step (S20) of connecting the tip at one side end of the cut optical cable (10) to another side end of the optical cable (10) which is coupled to the assembly (20) and sheathing an attachment part by inserting the sleeve (30) into a connection part;

a step (S30) of sheathing an outer side of the connected optical cable (10) with the frame (40) and inserting and fixing the assembly (20) into an edge at one side of the frame (40);

a step (S40) of coupling the fixing unit (50) to an edge at another side of the frame (40) to fix the frame (40) through compression;

a step (S50) of coupling the protective cap (100) protecting the assembly (20) to one end of the frame (40) and coupling and fixing the housing (60) to the outer peripheral edge of the frame (40) by coupling the protective cap (100) to the rotation cap (70);

a step (S60) of coupling the protective tube (80) such that a side of the housing (60) is partially sheathed to fulfill waterproofing and the outer peripheral edge of the optical cable (10) is sheathed; and a step (S70) of protecting the optical cable from excessive bending by coupling the boot (90) to the outer side of the protective tube (80).

10. The optical connector plug for outdoor waterproof onsite assembly according to claim 1, wherein the fixing unit (50) is configured of one of a clamp ring, a rotating ring, or a fastening ring.

11. A method for manufacturing an optical connector plug for outdoor waterproof onsite assembly according to claim 10, comprising:

a step (S10) of cutting the optical cable (10) based on a construction length of the optical cable on a site where the optical cable (10) is constructed;

a step (S20) of connecting the tip at one side end of the cut optical cable (10) to another side end of the optical cable (10) which is coupled to the assembly (20) and sheathing an attachment part by inserting the sleeve (30) into a connection part;

a step (S30) of sheathing an outer side of the connected optical cable (10) with the frame (40) and inserting and fixing the assembly (20) into an edge at one side of the frame (40);

a step (S40) of coupling the fixing unit (50) to an edge at another side of the frame (40) to fix the frame (40) through compression;

a step (S50) of coupling the protective cap (100) protecting the assembly (20) to one end of the frame (40) and coupling and fixing the housing (60) to the outer peripheral edge of the frame (40) by coupling the protective cap (100) to the rotation cap (70);

a step (S60) of coupling the protective tube (80) such that a side of the housing (60) is partially sheathed to fulfill waterproofing and the outer peripheral edge of the optical cable (10) is sheathed; and a step (S70) of protecting the optical cable from excessive bending by coupling the boot (90) to the outer side of the protective tube (80).

12. A method for manufacturing an optical connector plug for outdoor waterproof onsite assembly according to claim 1, comprising:

a step (S10) of cutting the optical cable (10) based on a construction length of the optical cable on a site where the optical cable (10) is constructed;

a step (S20) of connecting the tip at one side end of the cut optical cable (10) to another side end of the optical cable (10) which is coupled to the assembly (20) and sheathing an attachment part by inserting the sleeve (30) into a connection part;

a step (S30) of sheathing an outer side of the connected optical cable (10) with the frame (40) and inserting and fixing the assembly (20) into an edge at one side of the frame (40);

a step (S40) of coupling the fixing unit (50) to an edge at another side of the frame (40) to fix the frame (40) through compression;

a step (S50) of coupling the protective cap (100) protecting the assembly (20) to one end of the frame (40) and coupling and fixing the housing (60) to the outer peripheral edge of the frame (40) by coupling the protective cap (100) to the rotation cap (70);

a step (S60) of coupling the protective tube (80) such that a side of the housing (60) is partially sheathed to fulfill waterproofing and the outer peripheral edge of the optical cable (10) is sheathed; and a step (S70) of protecting the optical cable from excessive bending by coupling the boot (90) to the outer side of the protective tube (80).

13. A method for manufacturing an optical connector plug for outdoor waterproof onsite assembly, the assembly comprising an optical connector that is coupled to a tip of an optical cable cut on a site, wherein the tip at one side of the optical cable (10) is attached to an assembly (20) in a sealing or mechanical manner, and a frame (40) sheathing an outer side of the optical cable (10) has one side end to which an outer peripheral edge of the assembly (20) is coupled, has one or more slits (42) which are cut from a middle to another side end and are formed to be widened and narrowed in compliance with an outer diameter of the optical cable (10), and has a step (41) on an outer peripheral edge at one side end to be held by an inner peripheral edge of a housing (60) so as to withstand tensile strength applied to the optical cable (10), the method comprising:

- a step (S10) of cutting the optical cable (10) based on a construction length of the optical cable on a site where the optical cable (10) is constructed;
- a step (S20) of connecting the tip at one side end of the cut optical cable (10) to another side end of the optical cable (10) which is coupled to the assembly (20) and sheathing an attachment part by inserting a sleeve (30) into a connection part;
- a step (S30) of sheathing an outer side of the connected optical cable (10) with the frame (40) and inserting and fixing the assembly (20) into an edge at one side of the frame (40);
- a step (S40) of coupling a fixing unit (50) to an edge at another side of the frame (40) to fix the frame (40) through compression;
- a step (S50) of coupling a protective cap (100) protecting the assembly (20) to one end of the frame (40) and coupling and fixing the housing (60) to the outer peripheral edge of the frame (40) by coupling the protective cap (100) to a rotation cap (70);
- a step (S60) of coupling a protective tube (80) such that a side of the housing (60) is partially sheathed to fulfill waterproofing and an outer peripheral edge of the optical cable (10) is sheathed; and
- a step (S70) of protecting the optical cable from excessive bending by coupling a boot (90) to an outer side of the protective tube (80).

\* \* \* \* \*